(12) United States Patent
Renziehausen (10) Patent No.: US 7,112,030 B2
(45) Date of Patent: Sep. 26, 2006

(54) ROLL OFF HOIST WITH FRONT RETRACTABLE LOADING FRAME

(76) Inventor: Dan C. Renziehausen, 5137 Keiners La., Pittsburgh, PA (US) 15205

( * ) Notice: Subject to any disclaimer, the term of this patent is extended or adjusted under 35 U.S.C. 154(b) by 185 days.

(21) Appl. No.: 10/825,612

(22) Filed: Apr. 15, 2004

(65) Prior Publication Data

US 2005/0036866 A1 Feb. 17, 2005

Related U.S. Application Data (60) Provisional application No. 60/464,401, filed on Apr. 18, 2003.

(51) Int. Cl.
*B60P 1/64* (2006.01)
(52) U.S. Cl. .................. 414/500; 414/494; 414/477; 414/491
(58) Field of Classification Search ................ 414/500
See application file for complete search history.

(56) References Cited

U.S. PATENT DOCUMENTS

| 3,034,674 | A | * | 5/1962 | Bertoglio et al. | ............ 414/494 |
| 4,109,810 | A | * | 8/1978 | Jones | ........................ 414/477 |
| 4,529,349 | A |   | 7/1985 | Lutz | |
| 4,740,132 | A | * | 4/1988 | Peyre | ........................ 414/494 |
| 4,840,532 | A | * | 6/1989 | Galbreath | .................... 414/479 |
| 4,934,898 | A | * | 6/1990 | Galbreath | .................... 414/812 |
| 4,986,719 | A | * | 1/1991 | Galbreath | .................... 414/478 |
| 5,088,875 | A | * | 2/1992 | Galbreath et al. | .......... 414/478 |
| 5,562,391 | A | * | 10/1996 | Green | ........................ 414/500 |
| 5,639,207 | A | * | 6/1997 | Green | ........................ 414/812 |
| 6,068,440 | A | * | 5/2000 | Lang et al. | .................. 414/494 |
| 6,332,746 | B1 | * | 12/2001 | Lang et al. | .................. 414/494 |
| 6,354,787 | B1 | * | 3/2002 | O'Daniel | .................... 414/494 |

* cited by examiner

*Primary Examiner*—Kathy Matecki
*Assistant Examiner*—Charles Greenhut
(74) *Attorney, Agent, or Firm*—Blynn L. Shideler; Krisanne Shideler; BLK Law Group (57) ABSTRACT

A roll off container hoist with a front retractable loading frame includes a hoist with a break or discontinuity of the loadable frame structure at a forward end of the hoist. The roll off container hoist is mounted on a vehicle having hydraulic circuits for operating the hoist. The hoist includes a main hoist frame pivoted to a vehicle frame at a rear pivot point. The hoist includes a main lift cylinder attached to the vehicle frame and the main hoist frame for pivoting the main hoist frame to the loading/unloading position. The hoist includes an extension frame slidably coupled to the main hoist frame and extendable there-from that is loadable at any dump angle.

15 Claims, 8 Drawing Sheets

ROLL OFF HOIST WITH FRONT RETRACTABLE LOADING FRAME

CROSS REFERENCE TO RELATED APPLICATION

The present application claims the benefit of provisional patent application Ser. No. 60/464,401 entitled "Roll off Container Hoist with Retractable Loading Frame" filed on Apr. 18, 2003 that is incorporated herein by reference in its entirety.

BACKGROUND OF THE INVENTION

1. Field of the Invention

The present invention relates to roll off container hoists, also called roll off hoists, and more particularly, directed toward a roll off container hoists accommodating low overhead clearance or obstructions, e.g. tree branches, wires, buildings and the like, will full roll off capabilities.

2. Background Information

In general, transportable containers are utilized for a great variety of materials including solid and liquid waste products. The containers are adapted to be picked up and set off by a transport vehicle such as a truck, or a trailer for larger containers, with a suitable lift device known as a "roll-off hoist" or a "roll off container hoist".

Containers for freight, bulk materials, and other products come in numerous sizes and load capacities. Open Top Containers are generally available from about 10 Cubic Yard to 60 Cubic Yard capacity depending on the individual need. Containers typically have a ¼" floor or ³⁄₁₆" floor. Side material ranges from 12 gauge to ³⁄₁₆". Containers can have conventional side stake style sides or "T" sidewall style that eliminates side posts.

It has been a common practice to pull each container, regardless of its size and loading, aboard the transport vehicle with its forward end abutting a fixed stop on the vehicle. It has been proposed that with such a system, the center of gravity of the container may often be located in an unfavorable position on the transport vehicle, imposing unnecessarily high loading upon a weaker area of the vehicle frame and imparting unnecessarily heavy loading to the hoist during loading and unloading of the hoist. Additionally the conventional roll off container hoist designs do not accommodate normal operation in height restricted areas.

U.S. Pat. No. 5,088,875 addressed the problem of designing a hoist to accommodate very large containers that create undesirable stress problems. The solution provided was a more complicated and costlier frame design. Specifically the roll-off hoist of the '875 patent included a trailer main frame, a roll-off hoist frame hingedly connected to the rearward end of the main frame with the hoist frame defining a second pair of tracks which align with the first pair of tracks when the hoist frame is in the horizontal transport position, and a trolley mounted to slide within the first and second pair of tracks, and actuator means interposed between the trolley and the hoist frame for moving the trolley within the first and second pairs of tracks and moving a container connected to the trolley forwardly of the hoist frame.

The '875 patent included structure to prevent the trolley, or carriage, from being extended until the hoist frame was in the horizontal position. The structure incorporated several separate hydraulic circuits to accommodate the various separately movable components, and a system to prevent the premature movement of the trolley. The hoist of the '875 patent did not provide full functioning roll off capabilities. Specifically, the trolley could not be extended in the elevated condition, the trolley could not absorb the loading in the elevated condition, a separate hydraulic mechanism is required for moving the trolley and a separate stopping mechanism is required to prevent the premature moving of the trolley. Finally the '875 patent is essentially limited to trailer applications.

Other roll off hoist designs are disclosed in U.S. Pat. Nos. 6,332,746, 6,068,440, 5,088,875, 4,986,719, 4,934,898, 4,840,186, and 4,529,349 which together with the '875 patent are incorporated herein by reference.

SUMMARY OF THE INVENTION

The above objects are achieved with a roll off container hoist with a front retractable loading frame according to the present invention. The present invention provides a hoist with a break or discontinuity of the frame structure at a forward end of the hoist. A roll off container hoist according to the present invention is mounted on a vehicle having hydraulic circuits for operating the hoist. The hoist includes a main hoist frame pivoted to a vehicle frame at a rear pivot point. The hoist includes a main lift cylinder attached to the vehicle frame and the main hoist frame for pivoting the main hoist frame to the loading/unloading position. The hoist includes an extension frame slidably coupled to the main hoist frame and extendable there-from. The extension frame and the main hoist frame combine to form a full functioning roll off hoist frame that can be loaded in any position.

The hoist includes a cable that can be attached to a carried container for assisting in the loading/unloading of the container. The cable may be attached to the extension frame and reeved around sheeves to extend from a forward end of the extension frame. The hoist may include a pair of loading cylinders on the main hoist frame attached to the extension frame for moving both the extension frame and the cable. A significant feature of the present invention is the simultaneous movement of the cable and the extension frame.

The extension frame is a frame structure and may have side rollers received in tracks in the front end of the main hoist frame to be moveable between an extended transportation position and a retracted load/unload position. The extension frame should effectively have a bearing (formed by the series of rollers) or the equivalent between the extension frame and the main hoist frame.

These and other advantages of the present invention will be clarified in the detailed description of the preferred embodiment together with the attached figures in which like reference numerals represent like elements throughout.

DETAILED DESCRIPTION OF THE PREFERRED EMBODIMENT

A roll off container hoist 10 according to the present invention is illustrated in FIGS. 1–8. The hoist 10 of the present invention is mounted on a vehicle 12 having a hydraulic circuit not shown) for operating the hoist 10 as generally known in the art. The hoist 10 includes a main hoist frame 14 pivoted to the vehicle frame 16 at rear pivot point 18. The vehicle frame 16 and the main hoist frame 14 are general steel framework structures as known in the art. The distal end of the main hoist frame 14 includes a nose 20 to assist in loading/unloading containers 22. The hoist 10 includes a main lift cylinder 24 attached to the vehicle frame 16 and the main hoist frame 14 for pivoting the main hoist frame 14 to the loading/unloading position as is generally known in the art.

The key feature of the present invention is the provision of an extension frame 26 coupled to the main hoist frame 14 and extendable there-from. The extension frame 26 and the main hoist frame 14 combine to form the front retractable loading frame with full functioning roll off capabilities (i.e. the frame can be fully loaded at any dump angle). The extension frame 26 is a steel frame structure having side rollers 28 received in tracks 30 in the front end of the main hoist frame 14 and moveable between the extended transportation position shown in FIG. 1 and the retracted load/unload position shown in FIG. 2. The rollers 28 form a bearing between the extension frame 26 and the main frame 14 for ease of repeated usage and for appropriate structural support of the extension frame 26. A neoprene wear block 32 is positioned between the vehicle frame 16 and the extension frame 26.

Figure 6:
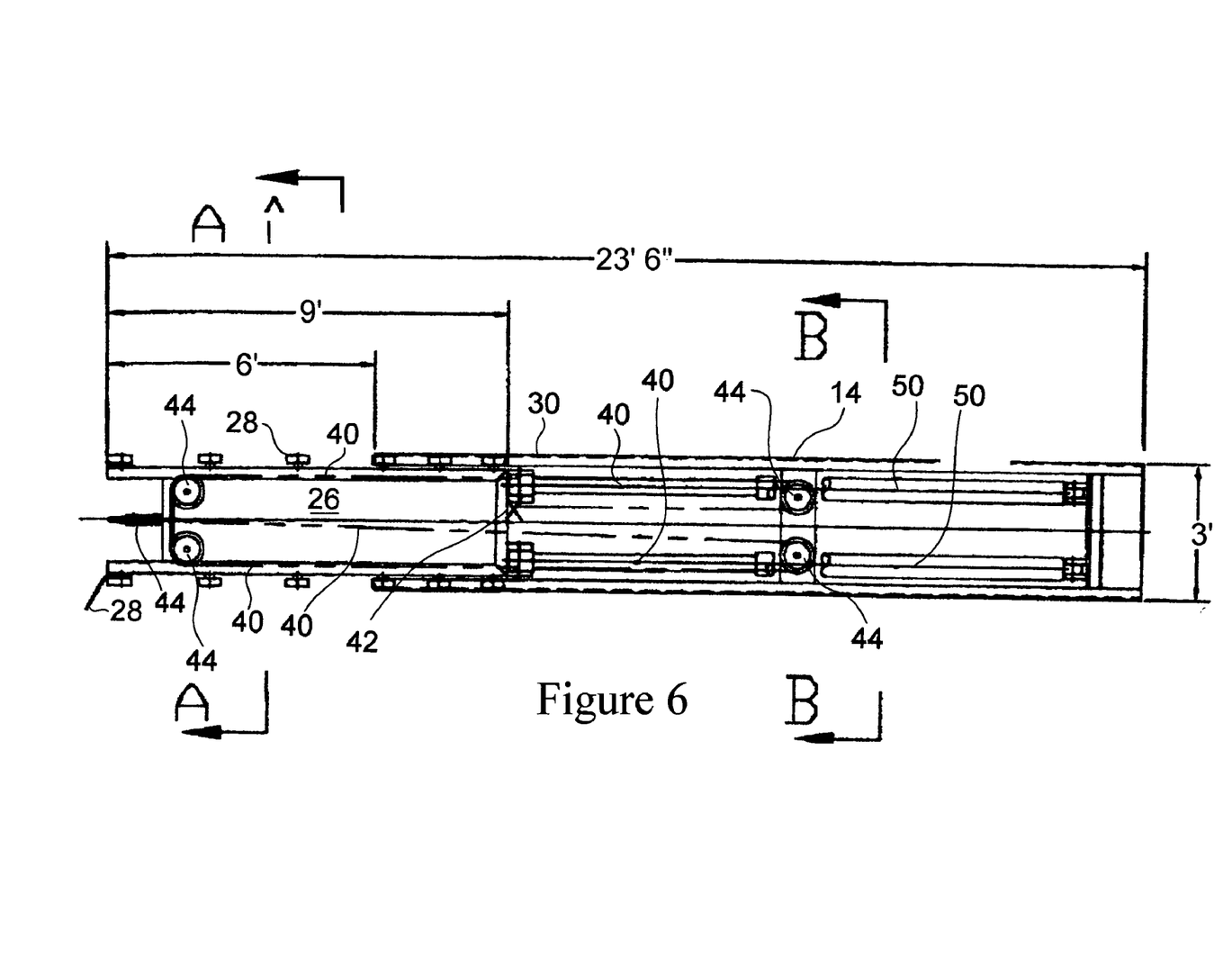
FIG. 6 is a schematic plan view of a roll off container hoist with a front retractable loading frame according to the present invention with the roll off container hoist in an extended position and showing center sheaves mounting flexibility.
Figure 7:
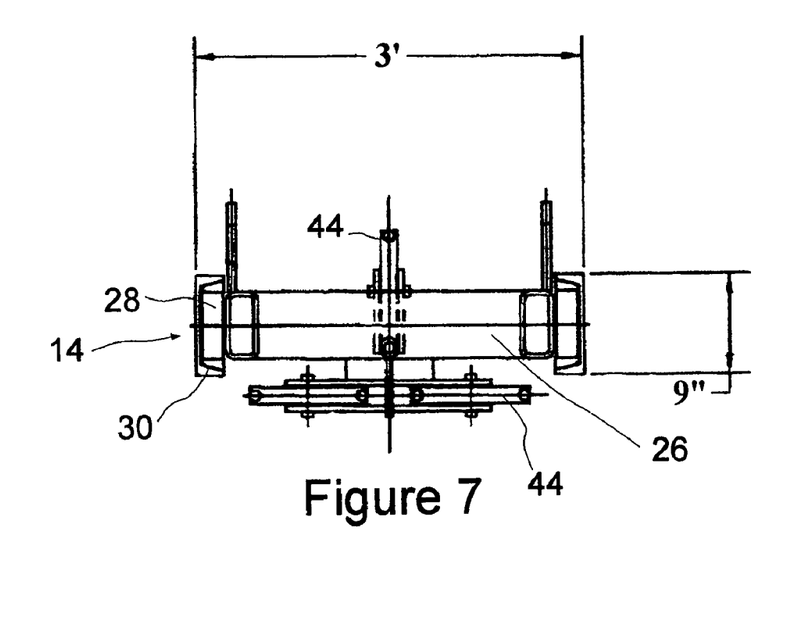
FIG. 7 is a schematic sectional view of a roll off container hoist with a front retractable loading frame according to the present invention taken along line A—A of FIG. 6.
Figure 8:
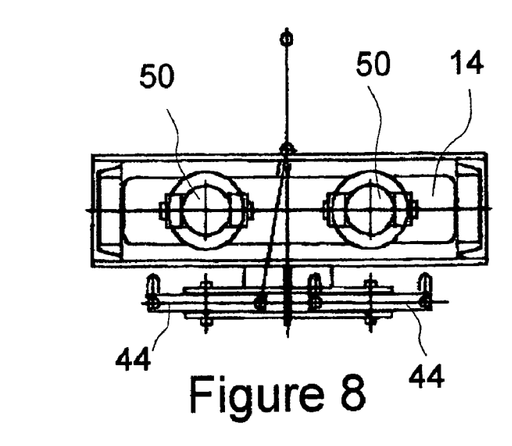
FIG. 8 is a schematic sectional view of a roll off container hoist with a front retractable loading frame according to the present invention taken along line B—B of FIG. 6.

The hoist 10 includes cable 40 that can be attached to the container 22 in a conventional manner for assisting in the loading/unloading of the container 22 onto and off of the hoist 10. The cable 40 is attached at an anchor end thereof through a cable anchor 42, shown in detail in FIGS. 9–10, to the extension frame 26. The cable 40 extends from the anchor end and is reeved around sheaves 44 exiting the final vertically mounted (e.g. horizontal axis) sheave 44 at the forward end of the extension frame 26. A standard coupling (not shown) may be positioned at the end for attachment to the container 22. As shown in FIG. 6, two of the sheaves 44 are on the main hoist frame 14 and three of the sheaves 44 are on the extension frame 26.

The reeving of the cable 40 is as follows: the cable 40 extends from the cable anchor 42 to the first sheave 44 on the main hoist frame 14 and is wrapped about 180 degrees, the cable 40 extends to a second sheave 44 on the extension frame 26 and is wrapped about 90 degrees, the cable 40 extends to a third sheave 44 on an opposite side of the extension frame 26 and is wrapped about 90 degrees, the cable extends to a fourth sheave 44 on the main hoist frame 14 and is wrapped about 180 degrees, the cable extends to a fifth sheave 44 vertically mounted on the forward end of the extension frame 26 and is wrapped 180 degrees, and the cable 40 extends to the container 22 above the extension frame 26 and the main hoist frame 14.

The hoist 10 includes a pair of loading cylinders 50 on the main hoist frame 14 and attached to the extension frame 26 for simultaneously moving both the extension frame 26 and the cable 40. The loading cylinders 50 move the extension frame 26 between the extended transportation position and the retracted position. The extension frame 26 will typically have a 9 foot length and be adapted to slide or extend about 6 feet. It will be apparent from a review of the reeving of the cable 40 that the movement of the extension frame 26 by the loading cylinders will also result in a corresponding motion of the cable 40. The motion of the cable is multiplied by the existence of the sheaves 44 as generally known in the art. The arrangement shown provides a 5–1 ratio such that he cable 40 moves 5 feet for every foot of travel of the loading cylinders 50. The specific dimensions and ratios can be altered as desired. A key aspect of the present invention is that the loading reeving cylinders 50 move both the cable 40 and the extension frame 26 loading the entire frame, at any dump angle.

Figure 1:
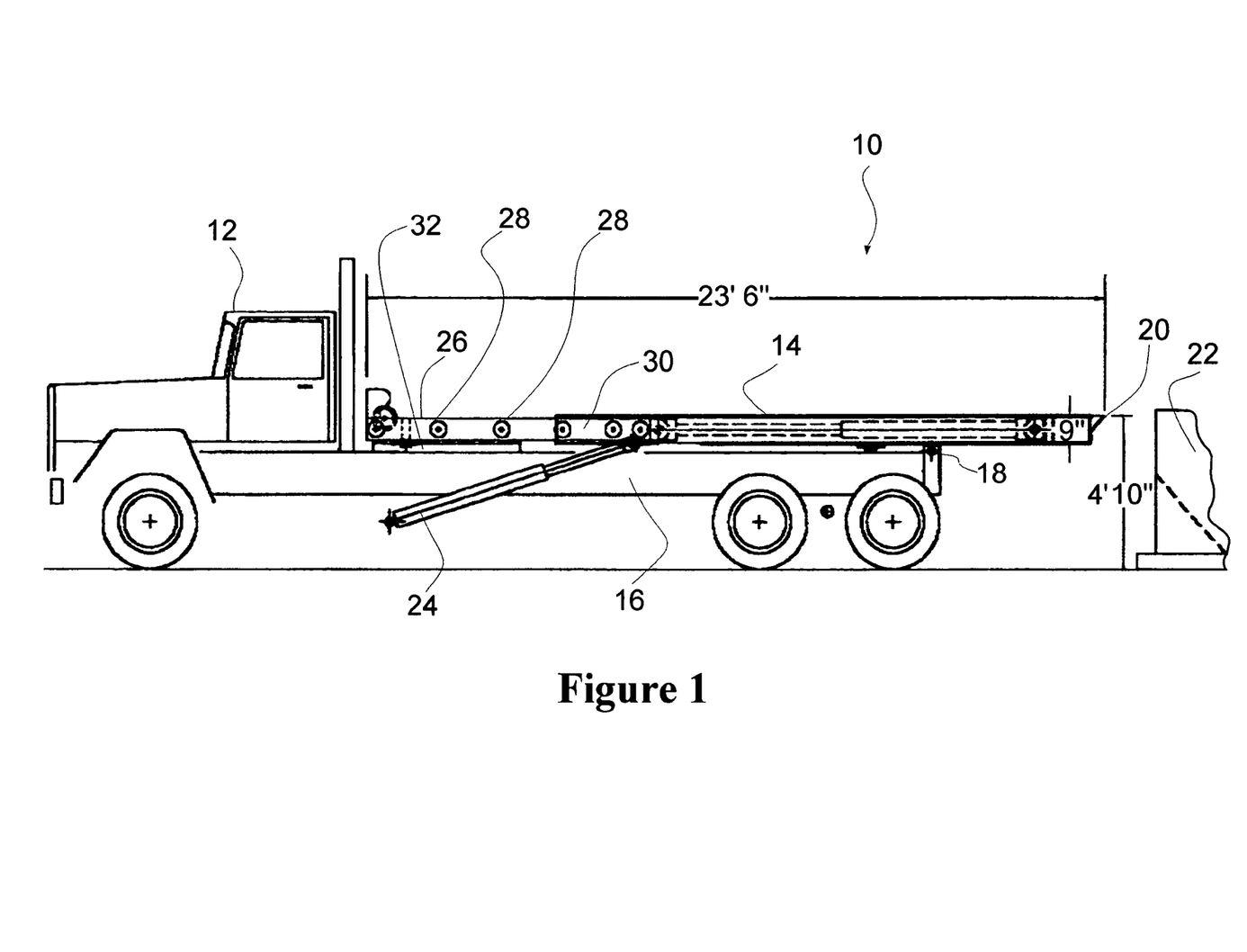
FIG. 1 is a schematic side view of a roll off container hoist with a front retractable loading frame according to the present invention with the roll off container hoist in the extended transporting position.
Figure 2:
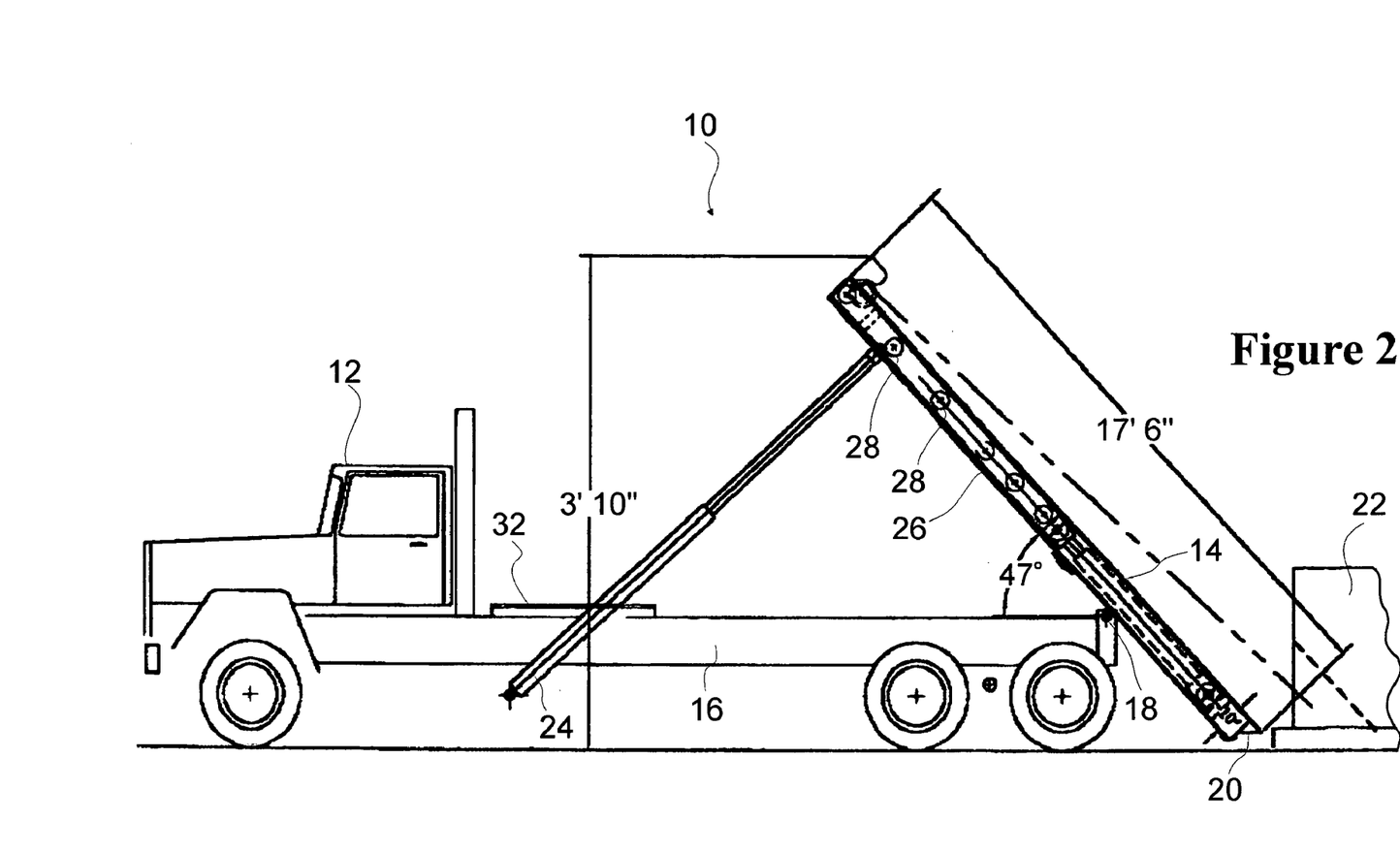
FIG. 2 is a schematic side view of a roll off container hoist with a front retractable loading frame according to the present invention with the roll off container hoist in the retracted position at the greatest dump angle.
Figure 3:
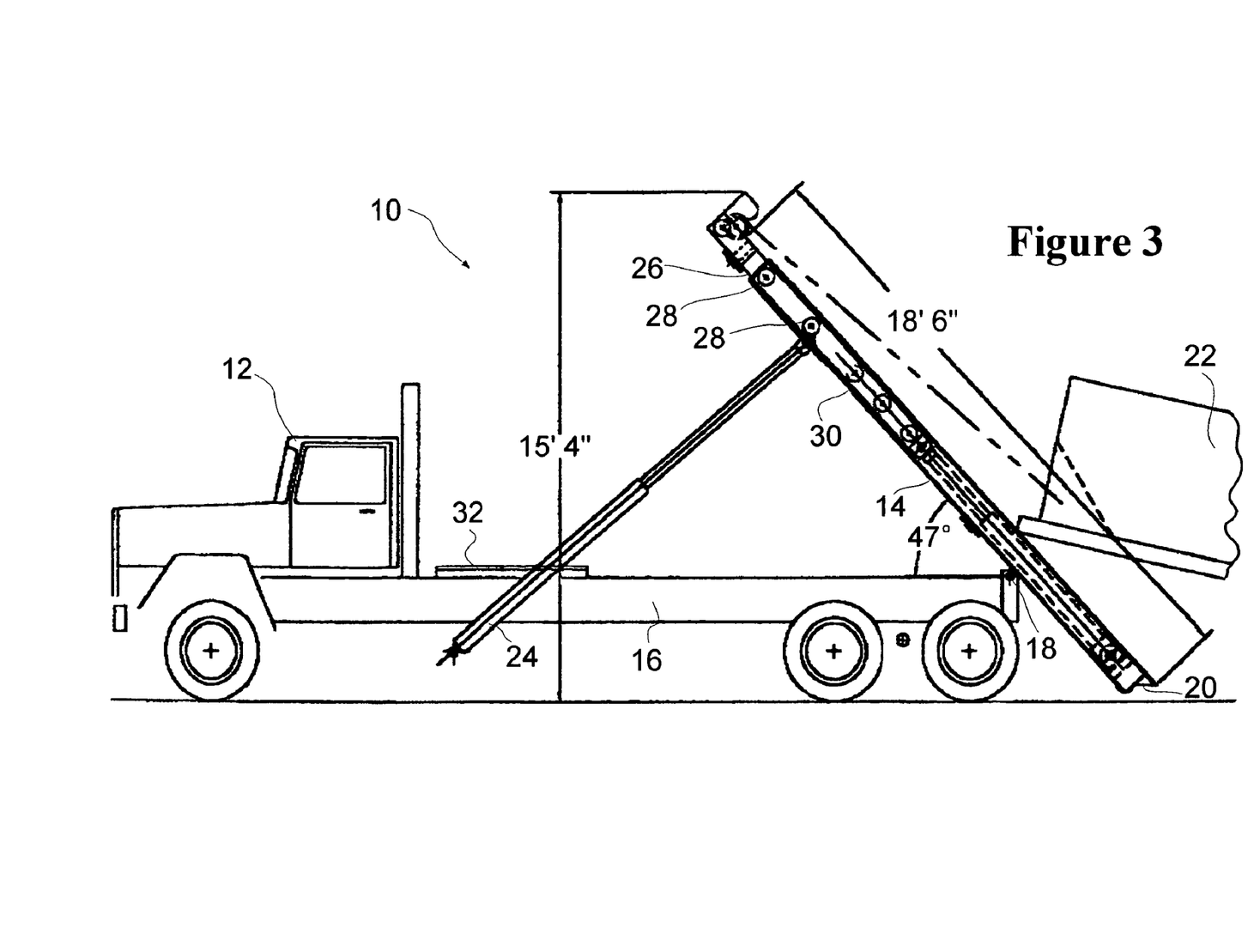
FIG. 3 is a schematic side view of a roll off container hoist with a front retractable loading frame according to the present invention with the roll off container hoist during the loading of a container at a point where the container is within the rails of the main hoist frame.
Figure 4:
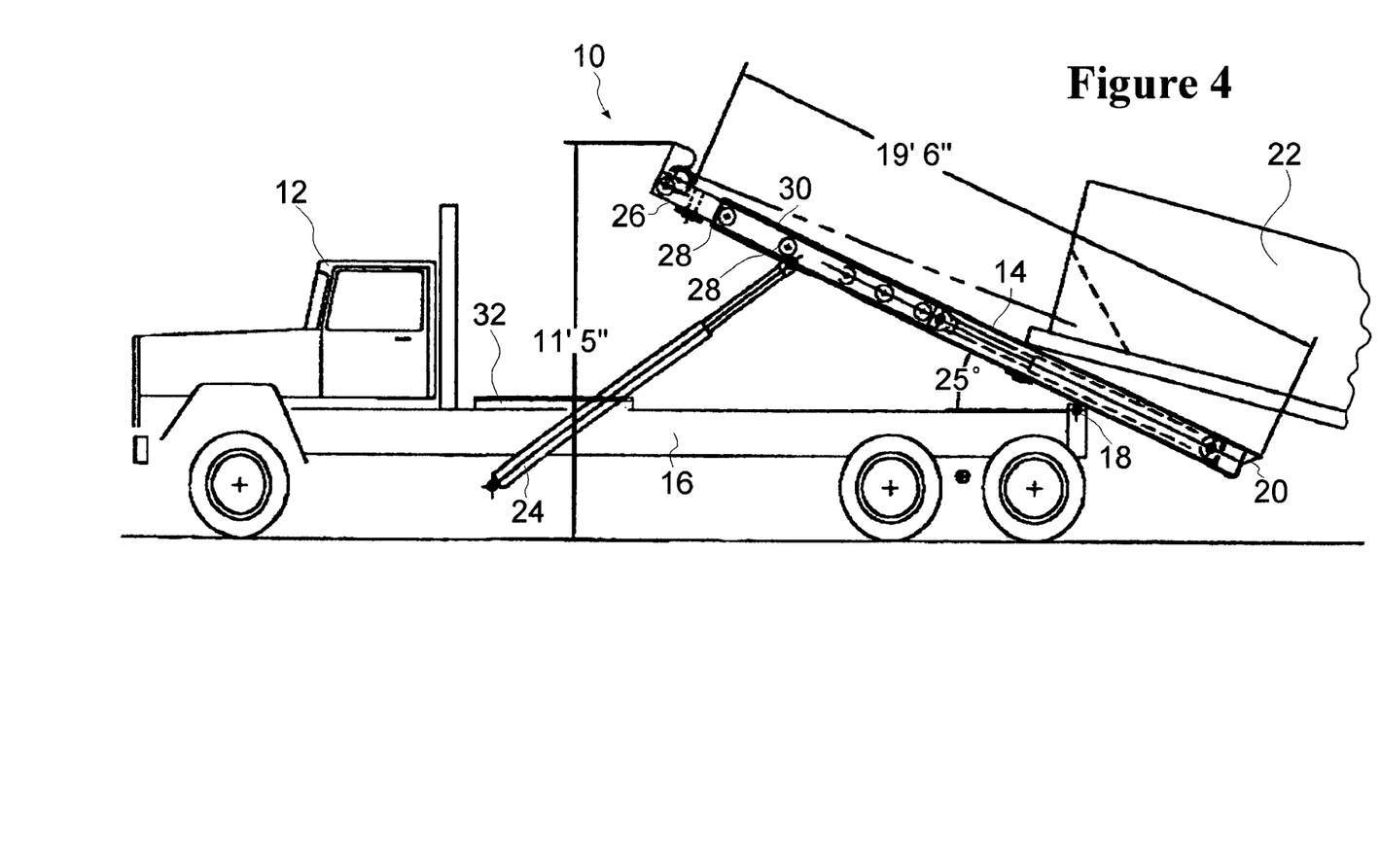
FIG. 4 is a schematic side view of a roll off container hoist with a front retractable loading frame according to the present invention with the roll off container hoist during the loading of a container and having a reduced dump angle.
Figure 5:
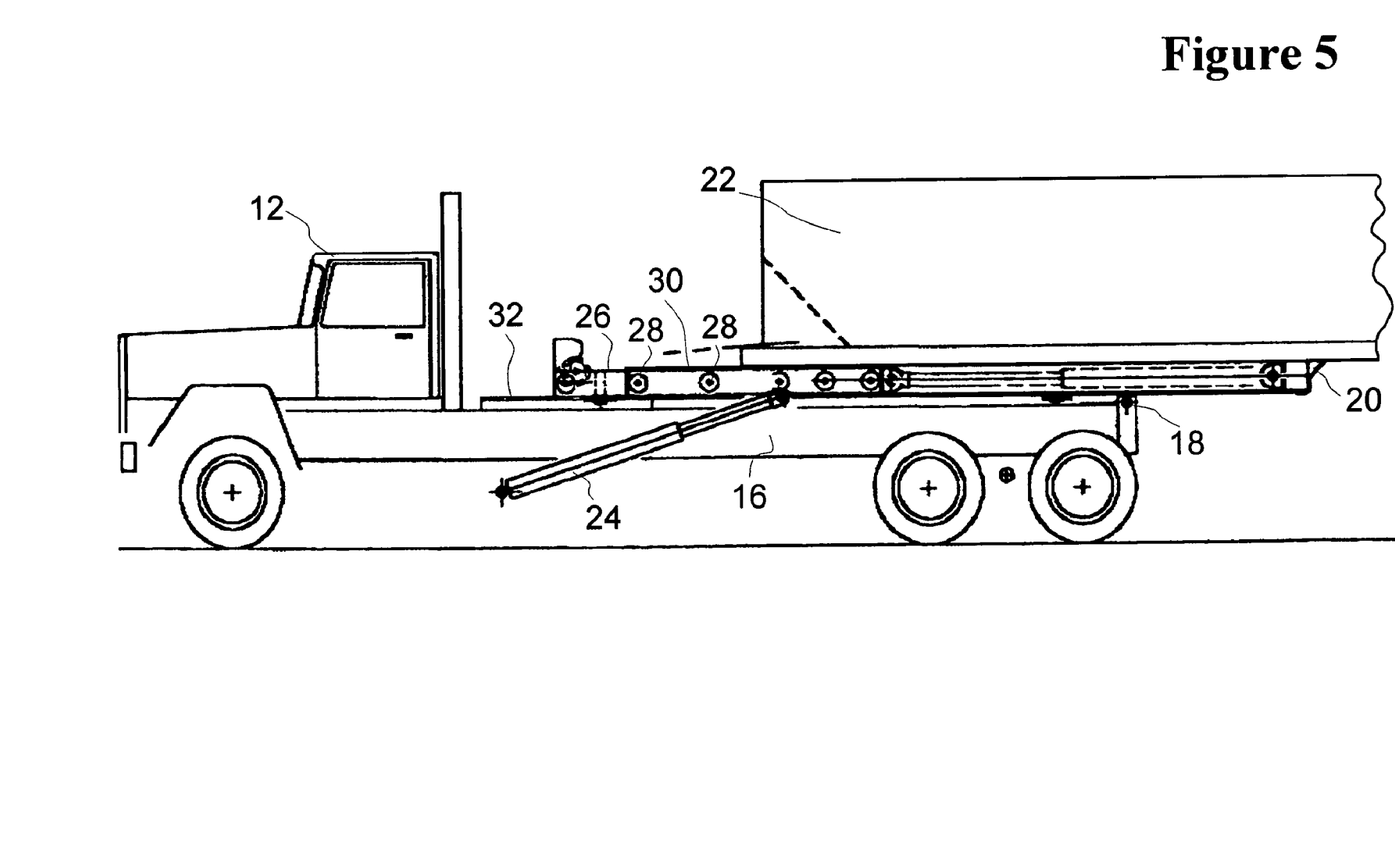
FIG. 5 is a schematic side view of a roll off container hoist with a front retractable loading frame according to the present invention with the roll off container hoist during the loading of a container with the frame in a horizontal position.

In a loading operation the hoist 10 will be pivoted to a full dump angle through the main lift cylinder 24 as shown in FIG. 2 to place the nose 20 adjacent the ground and adjacent the base of the container 22, as is needed for loading. The extension frame 26 will be in the fully retracted position, minimizing the total height of the hoist 10. This maximum dump angle is typically about 47 degrees and the height may be 13 feet 10 inches. With the container 22 coupled to the cable 40 the loading cylinders 50 can begin to retract the cable 40 and simultaneously extend the extension frame 26. As soon as the container 22 is engaged with rails of the main hoist frame 14 enough to secure the entry of the container the dump angle can be reduced by the operator, if needed. As shown in FIG. 3, the extension frame 26 will only be minimally extended when the container 22 is engaging the main hoist frame 14 at a position generally above the pivot point 18. If needed the dump angle could have been reduced at a position prior to that shown in FIG. 3. Consequently, where height is a concern, the 15'4" height or less of the hoist 10 shown in FIG. 3 is the relevant maximum height of the hoist 10. Again the dump angle can be reduced by the operator at any point after the container 22 has engaged the main hoist frame 14 enough to secure entry of the container 14. FIG. 4 shows the continued loading of the container 22 as the main lift cylinder 24 is lowering the loaded frame formed of the main frame 14 and the extension frame 26. FIG. 5 shows the continued loading of the container 22 as the main lift cylinder 24 has lowered the main frame 14 and the extension frame 26 to the horizontal transporting position. The cylinders 50 will move the extension frame 26 to the fully extended position and will simultaneously move the container 22 through the cable 40 to the transporting position at the forward end of the hoist 10.

The unloading of the container 22 from the hoist is generally the opposite of the loading operation. The movement of the container 22 off of the hoist 10 will generally be through gravity, however the retraction of the extension frame 26 by the cylinders 50 may assist this movement and the cable 40 will prevent the container from rolling uncontrolled. The unloading operation in a height restricted area does not have the same requirement of placing the nose 20 on the ground beneath the container 22, but allowing the nose 20 to contact the ground in such a situation (by essentially reversing the loading steps described above) will prevent or minimize damage to the ground (e.g. cracking the concrete or the like).

The hoist 10 of the present invention provides a height restricted hoist with no need for a third hydraulic circuit thereby simplifying the operation. The hoist 10 of the present invention provides for the maximum stresses and pressures to be on the extension frame 26 when the extension frame 26 is almost fully supported within the main hoist frame 14. This is in sharp contrast to the known extended tail configurations which have the highest stresses on an extended member (the tail) when the extended member is in the fully extended position. Additionally this is in sharp contrast to non frame members that cannot be loaded in the lifted positions (i.e. cannot be extended unless the frame is horizontal). The hoist 10 provides for a height restricted hoist which utilized a full strength main hoist frame at the nose 20 in place of a less sturdy extension.

Figure 9:
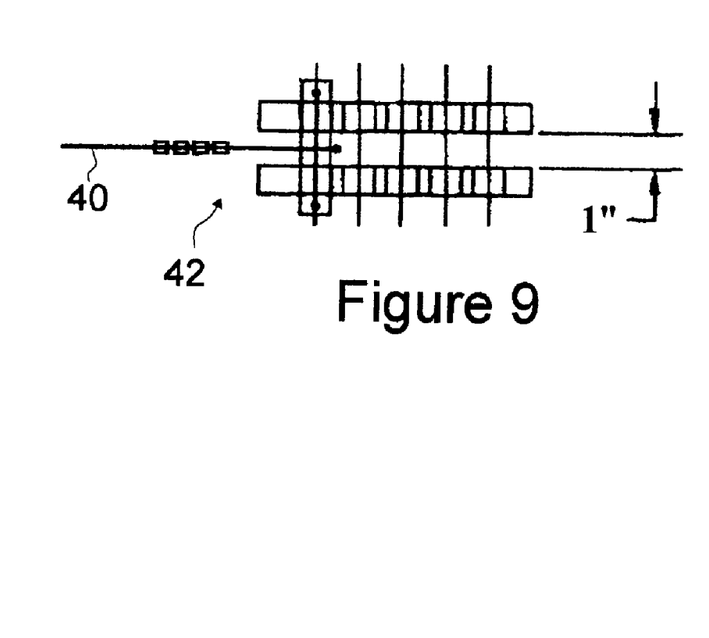
FIG. 9 is a schematic plan view of a cable anchor for a roll off container hoist with a front retractable loading frame according to the present invention.
Figure 10:
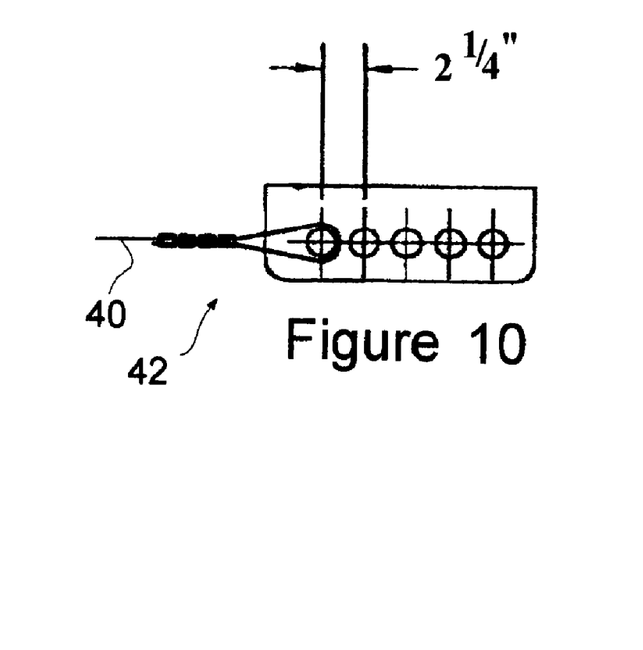
FIG. 10 is a side view of the cable anchor of FIG. 9.

The hoist 10 of the present invention included a mechanism for easily adjusting the total length of cable 40. As shown in FIGS. 9–10 the cable anchor 42 that couples the cable 40 to the extension frame 26 includes a plurality of spaced attachment points for easily attaching and adjusting the length of cable 40. This easily accommodates cable stretch or the like. Similar adjustable attachments can be incorporated into the mounting of the sheaves 44 to further provide for adjustment of the length of the cable 40.

It will be readily apparent to those of ordinary skill in the art that various changes may be made to the present invention without departing from the spirit and scope thereof. For example, additional sheaves 44 may be added to change the multiple of cable movement (and the associated length of cable needed), the position of the sheaves 44 may be adjusted to a degree greater than the miner adjustment discussed above. A new slider arrangement between the extension frame 26 and the main hoist frame 14 may be provided, as long as the bearing type arrangement is maintained. A direct metal on metal telescoping structure, for example, should be avoided due to the loading of the extension frame 26.

A summary of the present invention is that the present invention provides a hoist 10 with a break or discontinuity of the frame at a forward end of the hoist 10. In the described embodiment the break in the loadable frame is between the main hoist frame 14 and the extension frame 26. Another modification would be to have the break be between the main hoist frame 14 and an extension frame (not shown) pivoted thereto. The pivot provides the break and allows for the height limitation. In other words the front frame is not aligned with the main frame in the fully tilted loading/unloading position. The described embodiment is intended to be illustrative of the present invention and not restrictive thereof. The scope of the present invention is intended to be defined by the appended claims and equivalents thereto.

I claim:

1. A roll off container hoist with a front retractable loading frame forming a hoist with a break of the loadable frame structure at a forward end of the hoist, said hoist comprising:
   a vehicle frame;
   a main hoist frame pivoted to said vehicle frame at a rear pivot point;
   a main lift cylinder attached to said vehicle frame and said main hoist frame for pivoting said main hoist frame relative to said vehicle frame;
   a loadable extension frame coupled to said main hoist frame forward of said pivot point and forming a break in the loadable frame structure of the hoist, wherein said loadable extension frame is extendable and retractable relative to said main hoist frame;
   a cable that is attachable to a container that is loaded onto and unloaded off of said roll off container hoist, wherein said cable is retractable relative to said main hoist frame to allow for loading of the container onto said roll off container hoist and extendable relative to said main hoist frame to allow for unloading of the container off of said roll off container hoist; and
   a cable and loadable extension frame cylinder assembly coupled between said main hoist frame and said loadable extension frame and configured for both (i) simultaneously extending said loadable extension frame and retracting said cable relative to said main hoist frame with said main hoist frame positioned at any angle relative to said vehicle frame, and (ii) simultaneously retracting said loadable extension frame and extending said cable relative to said main hoist frame with said main hoist frame positioned at any angle relative to said vehicle frame.

2. The hoist of claim 1 wherein the cable is configured to move relative to the main hoist frame a distance of about five times the distance that the extension frame is moved relative to the main hoist frame.

3. The hoist of claim 2 further including a plurality of rollers on said loadable extension frame engaged in tracks formed on said main hoist frame, wherein said rollers and said track form a bearing between said loadable extension frame and said main hoist frame.

4. The hoist of claim 3 further including a plurality of sheaves mounted on both said main hoist frame and said loadable extension frame including a vertically orientated sheave mounted on said loadable extension frame, wherein said cable is reeved around the plurality of sheaves on both said main hoist frame and said loadable extension frame and exits said vertically mounted sheave at the forward end of said extension frame.

5. The hoist of claim 4 wherein two of said sheaves are mounted on said main hoist frame and three of said sheaves are mounted on said extension frame.

6. A roll off container hoist with a front retractable loading frame for height restricted areas, said hoist comprising:
   a vehicle frame;
   a main hoist frame pivoted to said vehicle frame at a rear pivot point;
   a main lift cylinder attached to said vehicle frame and said main hoist frame for pivoting said main hoist frame relative to said vehicle frame;
   a loadable extension frame slidably coupled to said main hoist frame forward of said pivot point and extendable from and retractable into the main hoist frame and loadable with the main hoist frame at any dump angle relative to said vehicle frame;

a cable that is attachable to a container that is loaded onto and unloaded off of said roll off container hoist, wherein said cable is retractable relative to said main hoist frame to allow for loading of the container onto said roll off container hoist and extendable relative to said main hoist frame to allow for unloading of the container off of said roll off container hoist; and a cable and loadable extension frame cylinder assembly coupled between said main hoist frame and said loadable extension frame and configured for both (i) simultaneously extending said loadable extension frame and retracting said cable relative to said main hoist frame with said main hoist frame positioned at any angle relative to said vehicle frame, and (ii) simultaneously retracting said loadable extension frame and extending said cable relative to said main hoist frame with said main hoist frame positioned at any angle relative to said vehicle frame.

7. The hoist of claim 6 further including a plurality of rollers on said loadable extension frame engaged in tracks formed on said main hoist frame, wherein said rollers and said track form a bearing between said loadable extension frame and said main hoist frame.

8. The hoist of claim 7 wherein said cable is attached at an anchor end thereof through a cable anchor to said extension frame.

9. The hoist of claim 8 further including a plurality of sheaves mounted on both said main hoist frame and said loadable extension frame including a vertically orientated sheave mounted on said loadable extension frame, wherein said cable extends from said anchor end and is reeved around the plurality of sheaves on both said main hoist frame and said loadable extension frame and exits said vertically mounted sheave at the forward end of said extension frame.

10. The hoist of claim 9 wherein two of said sheaves are mounted on said main hoist frame and three of said sheaves are mounted on said extension frame.

11. The hoist of claim 10 wherein said cable extends from said cable anchor to a first said sheave on said main hoist frame and is wrapped about 180 degrees, said cable extends to a second said sheave on said extension frame and is wrapped about 90 degrees, said cable extends to a third said sheave on said extension frame and is wrapped about 90 degrees, said cable extends to a fourth said sheave on said main hoist frame and is wrapped about 180 degrees, said cable extends to a fifth said sheave which is vertically mounted on said forward end of said extension frame and is wrapped 180 degrees, and said cable extends to a container above said extension frame and said main hoist frame.

12. The hoist of claim 8 wherein said a cable and loadable extension frame cylinder assembly includes a pair of loading cylinders mounted on said main hoist frame and attached to said extension frame for simultaneously moving both said extension frame and said cable.

13. The hoist of claim 8 wherein the cable is configured to move relative to the main hoist frame a distance of about five times the distance that the extension frame is moved relative to the main hoist frame.

14. The hoist of claim 7 wherein the cable is configured to move relative to the main hoist frame a distance of about five times the distance that the extension frame is moved relative to the main hoist frame.

15. The hoist of claim 6 wherein the cable is configured to move relative to the main hoist frame a distance of about five times the distance that the extension frame is moved relative to the main hoist frame.

* * * * *